United States Patent Office 2,934,427
Patented Apr. 26, 1960

2,934,427

MANUFACTURE OF TITANIUM METAL

Luh C. Tao, Henderson, Nev., assignor to Titanium Metals Corporation of America, New York, N.Y., a corporation of Delaware No Drawing. Application December 30, 1957
Serial No. 705,731

7 Claims. (Cl. 75—84.5)

This invention relates to the production of metallic titanium and more particularly to improvements in the general process wherein titanium tetrachloride is reacted with a metallic reducing agent.

The general process to which this invention relates involves adding titanium tetrachloride to molten magnesium contained in a reactor under an atmosphere devoid of contaminants. The reaction produces metallic titanium as a result of the reduction of the titanium tetrachloride by the magnesium. A commercial embodiment employing these principles is known as the Kroll Process, and is described in U.S. Patent No. 2,205,854. In commercial practice of the Kroll Process, however, the efficiency of the magnesium reducing metal is generally not high. Magnesium utilization may not exceed 60 to 70% under ordinary conditions, and rarely if ever, reaches 75%. This occurs apparently because the titanium metal forms initially on the surface of the molten magnesium in the reactor and gradually bridges across the reactor walls to form a more or less dense deposit of titanium sponge. Considerable metallic magnesium apparently remains underneath the crust or mass of titanium metal product, or may be trapped in the pores of its sponge-like structure, and is not available for reaction with $TiCl_4$ instilled from the top of the reactor. The low efficiency of magnesium utilization results in loss of this material and also complicates the subsequent separation of the titanium sponge product from excess magnesium employed and the magnesium chloride by-product.

Steel pots are most often employed as reactor vessels in operation of the Kroll process and providing they are maintained at moderate temperatures, are quite satisfactory. In order to prevent reaction between titanium and iron the temperature of the reactor wall must generally be maintained below about 900° C. If the reactor wall temperature is allowed to rise above 900° C. for any appreciable time the pot will be seriously corroded and the titanium sponge contaminated with an undesirably high iron content. While increasing reaction temperature will increase magnesium efficiency, often up to about 85% or slightly higher for temperatures of the order of 950° C. to 1000° C., commercial operation at these temperatures is not practicable due to pot corrosion and product contamination.

It is, therefore, the object of this invention to provide an improved method for the production of metallic titanium. Another object of this invention is to provide a method for production of titanium metal from titanium tetrachloride by reduction with metallic magnesium in which the utilization efficiency of the metallic magnesium reducing metal is substantially improved. A further object of this invention is to provide a method for production of titanium metal from titanium tetrachloride by reduction with metallic magnesium in which the utilization efficiency of the metallic magnesium reducing metal is substantially improved while operating such reduction at a temperature below about 900° C., measured as reactor wall temperature. A still further object of this invention is to provide a more efficient method for production of titanium metal by reaction of titanium tetrachloride with metallic magnesium as a reducing agent with respect to utilization of the metal magnesium reducing agent and subsequent separation of the titanium sponge from excess reagents and by-product magnesium chloride. These and other objects of this invention will be apparent from the following detailed description thereof.

This invention in its broadest aspects contemplates reduction of titanium tetrachloride with metallic magnesium as a reducing agent in which metallic magnesium is first charged into the reaction zone and heated to a temperature above the melting point of metallic magnesium. Titanium tetrachloride is then instilled into the reaction zone onto the molten magnesium until at least a major portion of the magnesium is reacted with the titanium tetrachloride to produce sponge titanium metal. Magnesium chloride by-product is drained from the reaction mass, which at this stage comprises titanium sponge product and unreacted metallic magnesium plus retained $MgCl_2$. Removal of the molten magnesium chloride from the reaction mass may be accomplished at intervals during the instillation of titanium tetrachloride, or continuously, if desired, or it may be removed at the end of this step in the operation. A salt selected from the group consisting of sodium chloride and potassium chloride is now introduced into the reaction zone and additional titanium tetrachloride instilled until sufficient has been introduced to provide at least 85% utilization of the metallic magnesium originally charged. During the entire reduction process the reaction zone is maintained free from contaminating gases; this may be accomplished by providing an inert atmosphere as by employing helium or argon in the reaction zone. As a result of the introduction of the $TiCl_4$ in the second addition step in the presence of the molten salt as described, the efficiency of utilization of the magnesium metal reducing agent is at least 5% greater than would have been obtained by operation under similar conditions without the presence of such salt. When operating at a temperature, measured as reactor wall temperature, of below 900° C. the 60 to 70% efficiency previously obtained is raised to over 85% and under certain conditions efficiencies of 90 to 95% or even higher may be obtained.

The first step of the reduction process according to this invention is carried on generally according to procedures known in this art. The metallic magnesium is charged into a suitable reaction pot which is then evacuated and an inert atmosphere of helium or argon is provided. The reaction pot with contained magnesium is placed in a suitable furnace and heated to about 750° C., this being above the melting point of metallic magnesium. Titanium tetrachloride is then introduced into the pot through a suitable pipe or other arrangement in the pot cover, the rate of $TiCl_4$ introduction being generally regulated so that the temperature of the reacting mass as indicated by reactor wall temperature preferably does not exceed 900° C. Since the reaction is exothermic, under ordinary conditions, heat need only be supplied to melt the magnesium, the heat of reaction maintaining the reaction zone at operating temperature thereafter. At times it may be necessary to cool the reaction pot by conventional and suitable means should the temperature, by reason of excess reaction speed and heat output, exceed the desired level.

Magnesium chloride by-product is preferably drained from the reaction pot intermittently during the first step of the reduction process. If desired, however, continuous drainage may be employed, although the mechanical arrangements for accomplishing this are somewhat more involved. Alternatively magnesium chloride may be allowed to remain in the reaction zone and then drained before the salt is added. Even when magnesium chloride is drained according to normally and well known procedure a certain amount remains with the reaction mass. However, unless at least 50% of the magnesium chloride is removed prior to salt addition an undesirable dilution of the added salt will occur. In addition, removal of the by-product magnesium chloride at this stage provides more space in the reaction pot for deposition of the product, titanium sponge.

Salt is added to the reaction zone after at least 50% of the titanium tetrachloride stoichiometrically required to react with the magnesium originally charged, has been added. A convenient time for salt addition is after the reaction has normally slowed down and insufficient magnesium is available for rapid reaction with instilled titanium tetrachloride. This point generally occurs when about 60 to 70% of the titanium tetrachloride has been introduced, and is the normally heretofore considered maximum amount which could be reacted with the magnesium.

The salt employed may be one selected from the group consisting of sodium chloride and potassium chloride. It should be employed in anhydrous or dried condition to avoid contamination of the titanium with moisture and its decomposition products, and may be added as powder, or in solid or molten state.

Presence of salt in the reaction zone with the reaction mass during the second TiCl$_4$ addition step may be accomplished by a single addition of sodium chloride or potassium chloride. It is preferred, however, to add the salt continuously or intermittently during the period that TiCl$_4$ is also added.

The amount of salt employed will preferably vary between 5 and 100% by weight of the metallic magnesium employed in the reaction. Less than 5% will not be found to be effective to promote rapid reaction of the TiCl$_4$ added in the second addition step. More than 100% may be employed without detriment as far as reaction efficiency is concerned, but its volume in the reaction zone is disadvantageous since it reduces the available space for production of product metal.

A convenient and advantageous amount of salt is one that will provide in the total MgCl$_2$ drainings a NaCl or KCl content of not more than about 10%. MgCl$_2$ may be reduced in electrolytic cells to recover metallic magnesium for re-use and the electrolyte cell bath generally contains substantial proportions of NaCl and KCl. Up to about 10% of these salts may therefore be present in MgCl$_2$ fed to the cells, the NaCl or KCl replacing all or part of such salts needed for replenishment of the cell electrolyte to replace that lost by cleaning or "smutting" operations.

TiCl$_4$ is introduced in the second addition step preferably at a rate so that the reactor wall temperature does not rise above about 900° C. and a convenient temperature range will be between 800° C. and 875° C.

It will be understood that the reaction temperature (measured as reactor wall temperature) should not exceed 900° C. during both steps in the operation of the preferred embodiment of this invention. Under these conditions high magnesium efficiencies may be obtained, that is, above 85%, and at the same time good reactor life and freedom from iron contamination in the product titanium is assured. If the reduction according to this invention is carried out at higher temperatures, for example between 900° C. and 1000° C., an increase in magnesium efficiency over that obtained by conventional processes operated at the same temperature will be obtained, but, however, with some adverse effect on reactor life and titanium product quality.

The following examples illustrate embodiments of this invention.

Example 1

A reactor was charged with 41 pounds of metallic magnesium, evacuated and back filled with helium. The charged reactor was then placed in a furnace and heated to 750° C. Titanium tetrachloride was instilled through a feed pipe in the reactor cover at a rate of 25 pounds per hour for a period of 4 hours. At the end of the second, third and fourth hours molten magnesium chloride by-product was drained from the reaction mass and tapped out of the reactor. The temperature of the reaction mass during the TiCl$_4$ addition remained between 800° C. and 850° C., determined by the reactor wall temperature, without addition of external heat.

At the end of the fourth hour of TiCl$_4$ addition it was noted that the reaction had slowed down and additional TiCl$_4$ could not be readily instilled without building up pressure in the reactor. The amount of TiCl$_4$ added up to the end of this step was 62.5% of that stoichiometrically required to react with the magnesium charged, to produce titanium metal.

Dry sodium chloride was then introduced into the reactor from a sealed helium filled hopper through a feed pipe in the reactor cover adjacent to the TiCl$_4$ feed pipe. The sodium chloride was fed continuously at a rate of 3 pounds per hour for 3 hours, simultaneously with the second step TiCl$_4$ addition of 47 pounds over this same time period. During this period the reaction proceeded readily and the total amount of TiCl$_4$ added was sufficient to result in an overall magnesium utilization of 92%. After all the TiCl$_4$ had been introduced, the reactor and contents were maintained at a temperature of 850° C. for ½ hour.

The salt by-product was then drained from the reactor and added to the magnesium chloride previously drained to provide a magnesium recovery cell feed containing 5% sodium chloride.

The reactor contents were cooled and the product removed and residual salt and unused magnesium separated by leaching with a dilute hydrochloric acid solution. Due to the small amount of residual magnesium the leaching was accomplished employing substantially less leaching acid than when the efficiency of magnesium utilization was that ordinarily obtained.

The titanium metal product was of good quality, having a hardness of 127 Brinell, and weighed 35 pounds.

For comparison a similar run was made using the same temperature, feed rates and other conditions but without the salt addition. Titanium tetrachloride could be added amounting in total to a magnesium efficiency of 67%, to produce only 26 pounds of titanium metal.

Example 2

A reactor was charged with 41 pounds of metallic magnesium, evacuated and back filled with helium. The charged reactor was then placed in a furnace and heated to 750° C. Titanium tetrachloride was instilled through a feed pipe in the reactor cover at a rate of 24 pounds per hour for a period of 4 hours. At the end of the second, third and fourth hours molten magnesium chloride by-product was drained from the reaction mass and tapped out of the reactor. The temperature of the reaction mass during the TiCl$_4$ addition remained between 800° C. and 850° C., determined by the reactor wall temperature, without addition of external heat.

At the end of the fourth hour of TiCl$_4$ addition it was noted that the reaction had slowed down and additional TiCl$_4$ could not be readily instilled without building up pressure in the reactor. The amount of TiCl$_4$ added up to the end of this step was 60.0% of that stoichiometrically required to react with the magnesium charged, to produce titanium metal.

Dry sodium chloride was then introduced into the reactor from a sealed helium filled hopper through a feed pipe in the reactor cover adjacent to the TiCl$_4$ feed pipe. The sodium chloride was fed intermittently, 12 pounds was fed at the end of the first step of TiCl$_4$ addition followed by 12 pounds more one hour later and 12 additional pounds two hours later. TiCl₄ addition was resumed at the time the first batch of sodium chloride, with 48 pounds added over a 3 hour period. During this period the reaction proceeded readily and the total amount of TiCl₄ added was sufficient to result in an overall magnesium utilization of 90%. After all the TiCl₄ had been introduced, the reactor and contents were maintained at a temperature of 850° C. for ½ hour.

The salt by-product was then drained from the reactor. The reactor and contents were cooled and the product removed and residual salt and unused magnesium separated by leaching with dilute hydrochloric acid solution. Due to the small amount of residual magnesium the leaching was accomplished employing substantially less leaching acid than when the efficiency of magnesium utilization was that ordinarily obtained.

The titanium metal product was of good quality, having a hardness of 132 Brinell, and weighed 36 pounds.

For comparison a similar run was made using the same temperature, feed rates and other conditions but without the salt addition. Titanium tetrachloride could be added amounting in total to a magnesium efficiency of 66%, to produce only 26 pounds of titanium metal.

Example 3

A reactor was charged with 41 pounds of metallic magnesium, evacuated and back filled with helium. The charged reactor was then placed in a furnace heated to 750° C. Titanium tetrachloride was instilled through a feed pipe in the reactor cover at a rate of 28 pounds per hour for a period of 4 hours. At the end of the second, third and fourth hours molten magnesium chloride by-product was drained from the reaction mass and tapped out of the reactor. The temperature of the reaction mass during the TiCl₄ addition remained between 800° C. and 850° C., determined by the reactor wall temperature, without addition of external heat.

At the end of the fourth hour of TiCl₄ addition it was noted that the reaction had slowed down and additional TiCl₄ could not readily be instilled without building up pressure in the reactor. The amount of TiCl₄ added up to the end of this step was 70.0% of that stoichiometrically required to react with the magnesium charged, to produce titanium metal.

Dry potassium chloride was then introduced into the reactor from a sealed helium filled hopper through a feed pipe in the reactor cover adjacent to the TiCl₄ feed pipe. The potassium chloride was fed continuously at a rate of 6 pounds per hour for 3 hours, simultaneously with the second step TiCl₄ addition of 29 pounds during the same period. During this period the reaction proceeded readily and the total amount of TiCl₄ added was sufficient to result in an overall magnesium utilization of 88%. After all the TiCl₄ had been introduced, the reactor and contents were maintained at a temperature of 850° C. for ½ hour.

The salt by-product was then drained from the reactor and added to the magnesium chloride previously drained to provide a magnesium recovery cell feed containing 10% potassium chloride.

The reactor and contents were cooled and the product removed and residual salt and unused magnesium separated by leaching with a dilute hydrochloric acid solution. Due to the small amount of residual magnesium the leaching was accomplished employing substantially less leaching acid than when the efficiency of magnesium utilization was that ordinarily obtained.

The titanium metal produced was of good quality, having a hardness of 130 Brinell, and weighed 35 pounds.

For comparison a similar run was made using the same temperature, feed rates and other conditions but without the salt addition. Titanium tetrachloride could be added amounting in total to a magnesium efficiency of 75%, to produce only 31 pounds of titanium metal.

The mechanism by which the presence of salt makes possible reaction of an increased amount of TiCl₄ in a second addition step is not precisely known. It is postulated that the resulting molten salt mixture with magnesium chloride, present and formed, more readily dissolves, or forms a more fluid mixture with titanium lower chlorides. The increased titanium lower chloride diffusion rate results in contact and reaction with substantially more metallic magnesium than could be utilized in the presence of magnesium chloride alone. Raising of the magnesium efficiency is of considerable commercial importance and substantially reduces the cost of producing titanium metal by the Kroll process. In addition, the reduced amount of unreacted magnesium contaminating the titanium sponge facilitates its purification. Whether the reaction impurities are separated by distillation or leaching, a substantial and valuable improvement is attained when the amount of magnesium to be removed is substantially reduced.

Presence of NaCl or KCl in the separated MgCl₂ is not harmful to its return to electrolytic cells for recovery of metallic magnesium. Actually it replaces such salts which would otherwise have to be ordinarily added to maintain the cell electrolyte.

The process of this invention provides an extremely important increase in magnesium efficiency over that normally obtained by magnesium reduction of titanium tetrachloride under similar temperature conditions. When operating under preferred conditions, that is, below about 900° C., magnesium efficiencies of over 85% are readily obtained together with good reactor life and purity of product titanium. The long reactor life and purity of product are well known to be obtained when operating at temperatures below about 900° C. and the process of this invention provides a much desired but hitherto unobtainable high magnesium efficiency while operating under such desirable temperature conditions.

This application is a continuation-in-part of application Serial No. 620,210, filed November 5, 1956, now abandoned.

I claim:

1. In a process for producing titanium metal in which metallic magnesium is reacted with titanium tetrachloride at elevated temperatures, the improvements which comprise adding to the magnesium at least 50% of the stoichiometric amount of the TiCl₄ required to react with the magnesium to produce titanium metal and removing at least a major part of the magnesium chloride by-product produced by such reaction from the reaction mass, and subsequently adding to the reaction mass a salt selected from the group consisting of sodium chloride and potassium chloride in amount from 5% to 100% by weight of the metallic magnesium, said addition of salt being made during addition of sufficient additional TiCl₄ to complete the reaction to provide a magnesium utilization at least 5% greater than would have been obtained under similar operating conditions without addition of said salt.

2. In a process for producing titanium metal in which metallic magnesium is reacted with titanium tetrachloride at elevated temperatures, below about 900° C., the improvements which comprise adding to the magnesium at least 50% of the stoichiometric amount of the TiCl₄ required to react with the magnesium to produce titanium metal and removing at least a major part of the magnesium chloride by-product produced by such reaction from the reaction mass, and subsequently adding to the reaction mass a salt selected from the group consisting of sodium chloride and potassium chloride in amount from 5% to 100% by weight of the metallic magnesium, said addition of salt being made during addition of sufficient additional TiCl₄ to complete the reaction to provide a magnesium utilization at least 5% greater than would have been obtained under similar operating conditions without addition of said salt.

3. In a process for producing titanium metal in which metallic magnesium is reacted with titanium tetrachloride at elevated temperatures, below about 900° C., the improvements which comprise adding to the magnesium at least 50% of the stoichiometric amount of the $TiCl_4$ required to react with the magnesium to produce titanium metal and removing at least a major part of the magnesium chloride by-product produced by such reaction from the reaction mass, and subsequently adding to the reaction mass a salt selected from the group consisting of sodium chloride and potassium chloride in amount from 5% to 100% by weight of the metallic magnesium, said addition of salt being made during addition of sufficient additional $TiCl_4$ to complete the reaction to provide a magnesium utilization of over 85%, and to provide a magnesium utilization at least 5% greater than would have been obtained under similar operating conditions without addition of said salt.

4. A process according to claim 1 in which the salt is sodium chloride.

5. A process according to claim 1 in which the salt is potassium chloride.

6. In a process for producing titanium metal in which metallic magnesium is reacted with titanium tetrachloride at elevated temperatures, the improvements which comprise adding to the magnesium at least 50% of the stoichiometric amount of the $TiCl_4$ required to react with the magnesium to produce tianium metal and removing at least a major part of the magnesium chloride by-product produced by such reaction from the reaction mass, and subsequently adding to the reaction mass a salt selected from the group consisting of sodium chloride and potassium chloride in total amount from 5% to 100% by weight of the metallic magnesium, said addition of salt being made intermittently during addition of sufficient additional $TiCl_4$ to complete the reaction to provide a magnesium utilization of over 85%, and to provide a magnesium utilization at least 5% greater than would have been obtained under similar operating conditions without addition of said salt.

7. In a process for producing titanium metal in which metallic magnesium is reacted with titanium tetrachloride at elevated temperatures, the improvements which comprise adding to the magnesium at least 50% of the stoichiometric amount of the $TiCl_4$ required to react with the magnesium to produce titanium metal and removing at least a major part of the magnesium chloride by-product produced by such reaction from the reaction mass, and subsequently adding to the reaction mass a salt selected from the group consisting of sodium chloride and potassium chloride in total amount from 5% to 100% by weight of the metallic magnesium, said addition of salt being made continuously during addition of sufficient additional $TiCl_4$ to complete the reaction to provide a magnesium utilization of over 85%, and to provide a magnesium utilization at least 5% greater than would have been obtained under similar operating conditions without addition of said salt.

References Cited in the file of this patent
UNITED STATES PATENTS
2,787,539    Conklin _____ Apr. 2, 1957